United States Patent [19]

Swessel, Jr.

[11] 3,749,341

[45] July 31, 1973

[54] BUS DUCT HANGER ASSEMBLY

[75] Inventor: John A. Swessel, Jr., Milwaukee, Wis.

[73] Assignee: Cutter-Hammer, Inc., Milwaukee, Wis.

[22] Filed: Mar. 31, 1972

[21] Appl. No.: 240,036

[52] U.S. Cl.................................. 248/59, 248/327
[51] Int. Cl................................................. F16l 3/12
[58] Field of Search................. 248/58, 59, 60, 317, 248/323, 327; 52/484

[56] References Cited
UNITED STATES PATENTS

| | | | |
|---|---|---|---|
| 2,523,869 | 9/1950 | Fleming............................... | 248/59 |
| 2,936,991 | 5/1960 | Picha et al........................ | 248/59 X |
| 3,190,604 | 6/1965 | Jorgensen et al.................. | 248/317 |
| 3,345,022 | 10/1967 | Jorgensen....................... | 248/327 X |

*Primary Examiner*—J. Franklin Foss
*Attorney*—John W. Michael et al.

[57] ABSTRACT

The bus duct hanger includes a L-shaped bracket having a vertical leg carrying a pair of oppositely disposed and laterally extending clamping members and a horizontal leg having a slotted opening receiving the lower end of a drop rod. Each clamping member has a downturned hook portion at the outer end which is adapted to receive and carry a respective outturned flange located on opposite sides of the bus duct. Each clamping member is secured to the duct housing by a screw which is tightened into engagement with the housing to draw the hook portion securely upwardly around the respective duct flange. A washer, interposed upper and lower jam nuts which are threaded onto the lower end of the drop rods, abuts a pair of upstanding nibs located on the bracket slot to prevent the hanger from falling off the end of the drop rod prior to the tightening of the jam nuts to secure the hanger to the drop rod.

5 Claims, 4 Drawing Figures

PATENTED JUL 31 1973 3,749,341
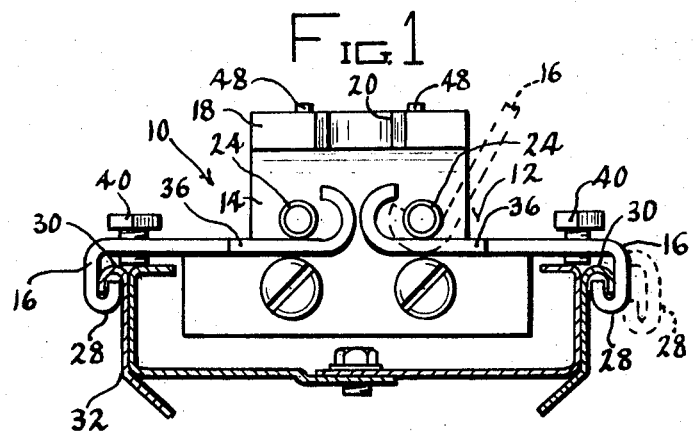
Fig.1
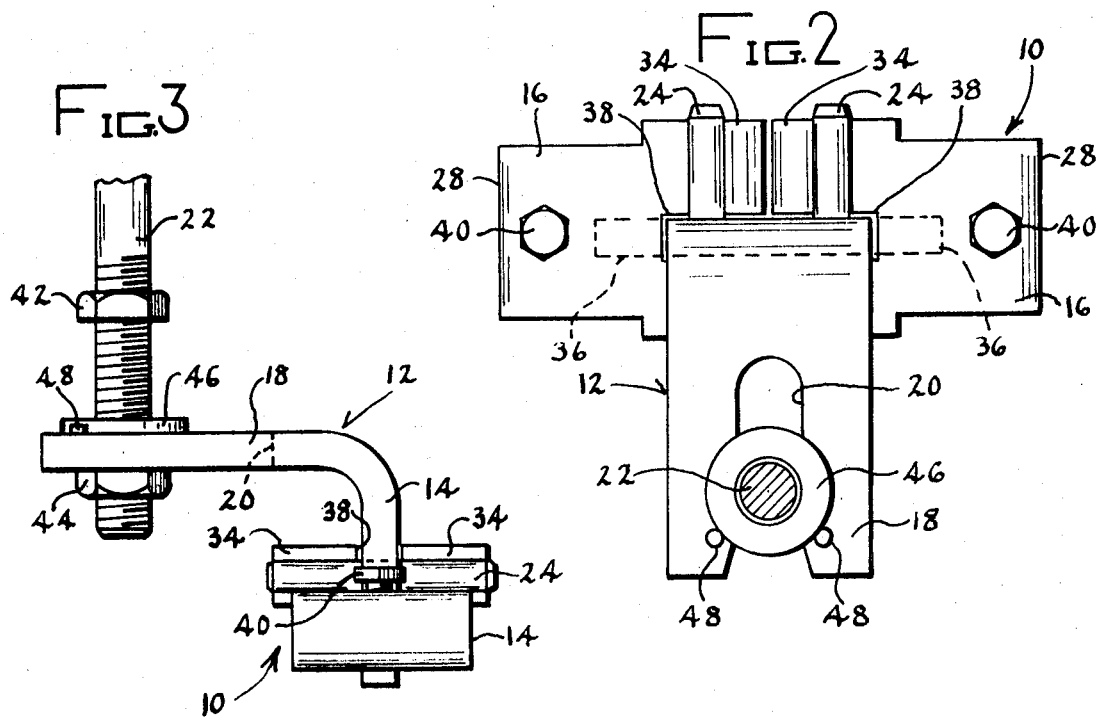
Fig.3
Fig.2
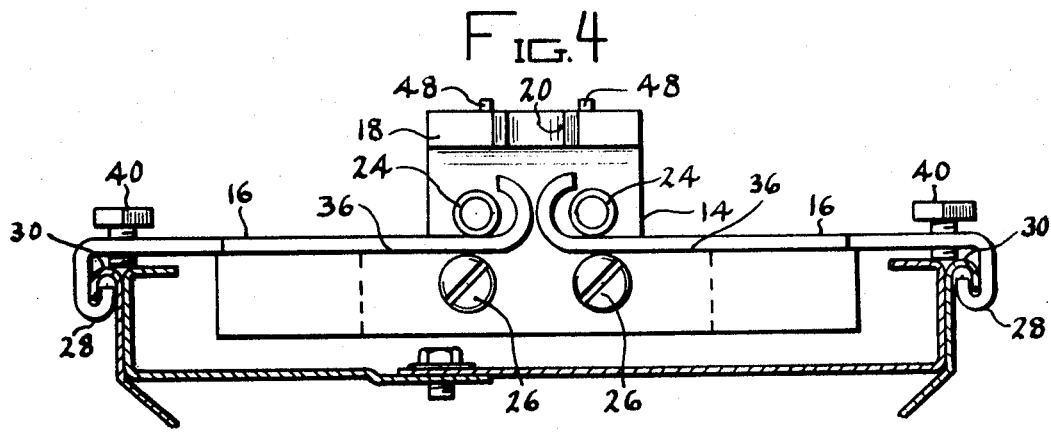
Fig.4

BUS DUCT HANGER ASSEMBLY

BACKGROUND OF THE INVENTION

This invention relates to electric busways and, more particularly, to bus duct hanger assemblies.

The most widely used means for supporting a bus duct is a plurality of longitudinally spaced hangers attached to the bus duct which are suspended from drop rods installed to the ceiling of a building. During a typical installation, a complete row of hangers is first attached at appropriately spaced locations along the duct, the duct is hoisted into position and the hangers are secured to the previously installed drop rods. The hangers usually include a hole which receives the threaded lower end of the drop rod and are secured to the rod by a pair of jam nuts. The drop rods are aligned with and inserted through the holes of their respective hanger with the lower jam nut removed. The nut is then threaded onto the rod to secure the hanger in place. The task of holding the duct in place for this alignment and nut installation could be cumbersome and time consuming.

SUMMARY OF THE INVENTION

The primary object of this invention is to provide a simply arranged bus duct hanger which can be installed into a drop rod without removing a jam nut.

Another object of this invention is to provide a duct hanger which can be easily attached to the duct housing and permits the duct to be moved longitudinally after attachment.

BRIEF DESCRIPTION OF THE DRAWINGS

FIG. 1 is a front elevational side view of the bus duct hanger assembly of this invention shown attached to a bus duct housing; a fragmentary cross-sectional view of the housing being shown.

FIG. 2 is a top plan view of the bus duct hanger shown secured to a drop rod which is shown in cross-section.

FIG. 3 is a side elevational view of the bus duct hanger shown secured to a drop rod; a fragmentary side view of the drop rod being shown.

FIG. 4 is a front elevational view of an alternate arrangement for the bus duct hanger when used for wide bus ducts; a fragmentary cross-sectional view of the housing being shown.

DESCRIPTION OF THE PREFERRED EMBODIMENTS

Bus duct hanger 10 includes a L-shaped bracket 12 which has a vertical leg 14 carrying a pair of oppositely disposed and laterally extending clamping members 16, and a horizontal leg 18 having an elongated slotted opening 20 receiving the lower end of the drop rod 22. Vertical leg 14 has a pair of laterally spaced, elongated pins 24 and a pair of laterally spaced bolts 26 between which the inner ends of clamping members 16 are positioned.

Each clamping member 16 includes an integral, downturned hook portion 28 at the outer end which is adapted to receive and carry flange 30 of bus duct housing 32, and an upturned rib 34 at the inner end, which cooperates with the respective pins 24 to limit lateral movement of the hanger during attachment to the bus duct as explained below.

Vertical leg 14 of bracket 12 is in the shape of an inverted T with a pair of oppositely disposed and laterally extending shoulders 36 supporting the respective clamping member. Each clamping member has a slot 38 in which vertical leg of the bracket is received. Clamping members 16 are secured to the bus duct housing 32 by screw 40 threaded into each member near the outer end. Screws 40 are tightened into engagement with the top edge of the bus duct housing to draw hook portion 28 upwardly around the respective flange 30 as shown in FIG. 1.

To attach the hanger to the bus duct housing, each screw 40 is unthreaded until its lower end is substantially flush with the underside of the clamping member. Each clamping member 16 is pivoted upwardly, with rib 34 pivoting about its respective pin 24 in the manner shown by dashed lines for the righthand member in FIG. 1. The hanger is then positioned over the top of the bus duct housing and the clamping members pivoted downwardly until they rest on respective shoulders 36 as shown by dashed lines for the righthand member in FIG. 1. The loose clamping members are retained in place on the bracket by the cooperation of pins 24 and the heads of bolts 26. Ribs 34 cooperate with pins 24 to limit the outward lateral movement of the clamping members so they do not fall off the bracket.

The clamping members are then pushed inwardly until hook portion 28 is aligned with their respective duct flange 30 and screws 40 are tightened into engagement with the top edge of duct housing 32 to draw the hook portions securely up around flanges 30. Screws 40 are preferably tightened only finger tight to prevent the hook portion from disengaging from the flange during handling of the duct but still loose enough so that the duct can be slid longitudinally in the hangers if required during installation onto the drop rods or assembly to an adjoining duct section.

After a row of hangers have been attached to the appropriately spaced locations along the bus duct, the duct is hoisted into position for installation onto the drop rods. Drop rods 22 have upper and lower jam nuts 42 and 44, respectively, threaded onto the lower end thereof with a washer 46 interposed the jam nuts. Washer 46 abuts a pair of upstanding nibs 48 located on horizontal leg 18 adjacent opposite sides of slot 20 when positioned against the top side of the horizontal leg, as shown in FIGS. 2 and 3. Prior to installation of a hanger onto a drop rod, washer 46 is lifted up so that the horizontal leg can be guided, via slot 20, onto the lower end of the drop rod between washer 46 and lower jam nut 44. The washer is then dropped into position between nibs 48 and abuts the nibs to prevent the hanger from slipping longitudinally off the end of the drop rod. After all the hangers have been installed onto their respective drop rod and the bus duct has been connected to an adjoining duct section via a joint connector, the jam nuts are tightened to securely clamp the hanger to the drop rod. Screws 40 can then be further tightened to restrain the duct against longitudinal movement with respect to the hangers.

FIG. 4 shows a bus duct hanger which has been modified to accomodate bus ducts having larger widths. This embodiment, an elongated support bar 50 is mounted to the lower end of vertical leg 14 by bolts 26 to provide additional lateral support for clamping members 16. Bolts 26 serve the dual function of securing a support arm to the bracket and the heads thereof retain the loose clamping member in place as described above.

From the above detailed description, it can be appreciated that a bus duct hanger arranged according to this invention can be easily and rapidly attached to the bus duct prior to hoisting the duct into place for installation onto the drop rod. The clamping members are arranged so the hanger is readily adaptable to duct housings of various widths. The use of a slotted opening in the hanger bracket permits the bus duct to be installed onto a row of drop rods without removing the lower jam nut, and without the need for precisely aligning a mounting hole in each hanger with the respective drop rod. In addition, the hanger can be attached to the duct housing so the longitudinal adjustment of the duct can be made after attachment and the washer cooperating with the nibs on the hanger bracket prevents the hanger from falling off the drop rod while the duct is being installed and properly positioned. Hence, the duct can be more easily and rapidly installed.

I claim:

1. A bus duct hanger attachable to a bus duct housing for suspending the bus duct from the lower end of a drop rod comprising:

a L-shaped bracket means having a lower vertical leg, which carries a pair of oppositely disposed and laterally extending clamping members, and an upper horizontal leg which has an open-ended slot for receiving the lower end of a drop rod;

a downturned hook portion located on the outer end of each of said clamping member, which is adapted to receive and carry a respective outturned flange located on the opposite sides of the bus duct housing, said clamping members being slideably mounted to said bracket means so they can be moved laterally to align said hook portions with their respective flange;

locking means associated with each of said clamping members which, upon operation, cooperates with the duct housing to releasably secure each of said hook portions to its respective flange so they will not become disengaged therefrom during subsequent handling of the bus duct;

fastening means which can be tightened to secure said horizontal leg to the lower end of a drop rod; and detent means for preventing said hanger from slipping longitudinally off a drop rod, after said horizontal leg has been guided onto the lower end of the drop rod via said slot, prior to tightening said fastening means.

2. The bus duct according to claim 1 wherein said detent means comprises:

a pair of upstanding nibs provided on the top surface of said horizontal leg and positioned on opposite sides of said slot near the open end thereof; and washer means slideably mounted on said drop rod which can be positioned adjacent the top surface of said horizontal leg to abut said nibs and thereby prevent the hanger from sliding longitudinally off said drop rod.

3. The bus duct hanger according to claim 2 wherein said locking means comprises a threaded member threaded into the outer end portion of each of said clamping members which can be tightened into engagement with the duct housing to draw said hook portions upwardly around their respective flange to secure them against becoming disengaged.

4. The bus duct hanger according to claim 3 wherein:

said vertical leg is in the form of an inverted T with the underside of said clamping members being slideably supported on the top edges of the corresponding lateral legs of said T;

said vertical leg includes a pair of parallel, longitudinally extending and laterally spaced, elongated pins positioned above the respective inner end portions of said clamping members; and each of said clamping members includes an upturned lip at its inner end which cooperates with a respective pin to limit the outward lateral movement of the clamping member.

5. The bus duct hanger according to claim 4 further including a laterally extending support member mounted to the lateral leg of said T and extending laterally past the outer ends of said T to provide additional support for said clamping members.

* * * * *